United States Patent
Igarashi et al.

(10) Patent No.: US 7,695,837 B2
(45) Date of Patent: Apr. 13, 2010

(54) FUEL CELL SYSTEM

(75) Inventors: Daishi Igarashi, Saitama-ken (JP);
Kenichiro Ueda, Saitama-ken (JP);
Junji Uehara, Saitama-ken (JP);
Koichiro Miyata, Saitama-ken (JP);
Shinji Yoshikawa, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 1176 days.

(21) Appl. No.: 11/287,521

(22) Filed: Nov. 23, 2005

(65) Prior Publication Data
US 2006/0115694 A1    Jun. 1, 2006

(30) Foreign Application Priority Data
Nov. 26, 2004    (JP)    ............................. 2004-342327

(51) Int. Cl.
*H01M 8/04* (2006.01)
(52) U.S. Cl. ........................................ 429/13; 429/25
(58) Field of Classification Search ........................ None
See application file for complete search history.

(56) References Cited

U.S. PATENT DOCUMENTS
2003/0022034 A1    1/2003    Suzuki

FOREIGN PATENT DOCUMENTS

| JP | 2002-352837 | 12/2002 |
| JP | 2003-36871 A1 | 2/2003 |
| JP | 2003-168467 | 6/2003 |
| JP | 2004-253208 | 9/2004 |
| JP | 2004-355890 | 12/2004 |

*Primary Examiner*—Jonathan Crepeau
(74) *Attorney, Agent, or Firm*—Lahive & Cockfield, LLP; Anthony A. Laurentano, Esq.

(57) ABSTRACT

A fuel cell system includes a fuel cell having a fuel gas flow path and an oxidant gas flow path; a compressor for supplying humidified air to the oxidant gas flow path; a back-pressure regulating valve for controlling pressure of humidified air in the oxidant gas flow path; a pressure sensor for measuring the pressure of the humidified air in the oxidant gas flow path; and a control section for controlling the compressor and the back-pressure regulating valve. In this system, the pressure of humidified air in the oxidant gas flow path is regulated to become equal or approximate to a target pressure by the back-pressure regulating valve. When the pressure difference between the pressure measured by the pressure sensor and the target pressure is larger than a predetermined pressure difference, the control section corrects operating conditions of the compressor, so that the measured pressure becomes the target pressure.

13 Claims, 3 Drawing Sheets

⟨In the case where the measured opening degree V11 of the back-pressure regulating valve 23 is equal to the target opening degree V1⟩

FUEL CELL SYSTEM

BACKGROUND OF THE INVENTION

1. Field of the Invention

The present invention relates to a fuel cell system.

2. Description of the Related Art

Recently, studies have been widely made to develop a fuel-cell stack (hereinbelow, frequently referred to as "fuel cell"), in which a plurality of single cells are stacked as a power supply for a fuel cell vehicle or the like. In the fuel cell, electric power is generated by supplying hydrogen gas (fuel gas) and humidified air (oxidant gas) to an anode side (fuel electrode side) and a cathode side (air electrode side), respectively, of a solid polyelectrolyte membrane (hereinbelow, this membrane is frequently referred to as "electrolyte membrane") forming a single cell.

Generally, hydrogen gas stored in a high-pressure hydrogen tank or the like is introduced to a reducing valve (pressure regulator) where the pressure of the hydrogen gas is reduced to a predetermined pressure, and then fed to the anode side of the fuel cell. However, the pressure of the hydrogen gas fed to the anode side is still higher than that of the humidified air on the cathode side. In order to adjust the balance in pressure between two sides of the fuel cell, a back-pressure regulating valve is disposed downstream of the fuel cell, which controls the pressure of the humidified air. Introduction of such a valve provides a means to prevent failures that may occur in various devices composing a fuel cell, such as electrolyte membrane (see JP2002-352837A, paragraph 0046 and FIG. 1).

However, even when the back-pressure regulating valve is opened to a predetermined degree, some foreign substance may clog the back-pressure regulating valve or the like and elevate the internal pressure of the fuel cell. As a result, devices such as a back-pressure regulating valve or a single cell composing a fuel cell will suffer stress, which may lead to deterioration or failure of the devices.

Examples of the foreign substances that may cause such a problem include ice and water expelled from the fuel cell by scavenging gas (air having a predetermined pressure) when the fuel cell with the inside thereof being frozen is started up.

Therefore, it would be desirable to provide a fuel cell system which can prevent failure and the like of devices that may be caused by the above-mentioned factors.

Illustrative, non-limiting embodiments of the present invention overcome the above disadvantages and other disadvantages not described above.

SUMMARY OF THE INVENTION

In one aspect of the present invention, a fuel cell system is provided which includes: a fuel cell having a fuel gas flow path and an oxidant gas flow path, the fuel cell generating electricity with fuel gas and oxidant gas supplied to the fuel gas flow path and the oxidant gas flow path, respectively; an oxidant gas supply means configured to supply oxidant gas to the oxidant gas flow path; a pressure control means which is disposed downstream of the fuel cell and configured to control pressure of the oxidant gas in the oxidant gas flow path; a pressure measuring means configured to measure the pressure of the oxidant gas in the oxidant gas flow path; and an operating condition control means configured to control the oxidant gas supply means and the pressure control means, wherein the pressure of the oxidant gas in the oxidant gas flow path is regulated to become equal or approximate to a target pressure by the pressure control means, and wherein when a pressure difference between the pressure measured by the pressure measuring means and the target pressure is larger than a predetermined pressure difference, the operating condition control means corrects the operating conditions of the oxidant gas supply means, so that the measured pressure becomes the target pressure.

BRIEF DESCRIPTION OF THE DRAWINGS

The various aspects, other advantages and further features of the present invention will become more apparent by describing in detail illustrative, non-limiting embodiments thereof with reference to the accompanying drawings.

DETAILED DESCRIPTION OF THE EXEMPLARY EMBODIMENTS

Embodiments of the present invention will be described below in detail with reference to FIGS. 1-3.

<<Configuration of Fuel Cell System>>

Figure 1:
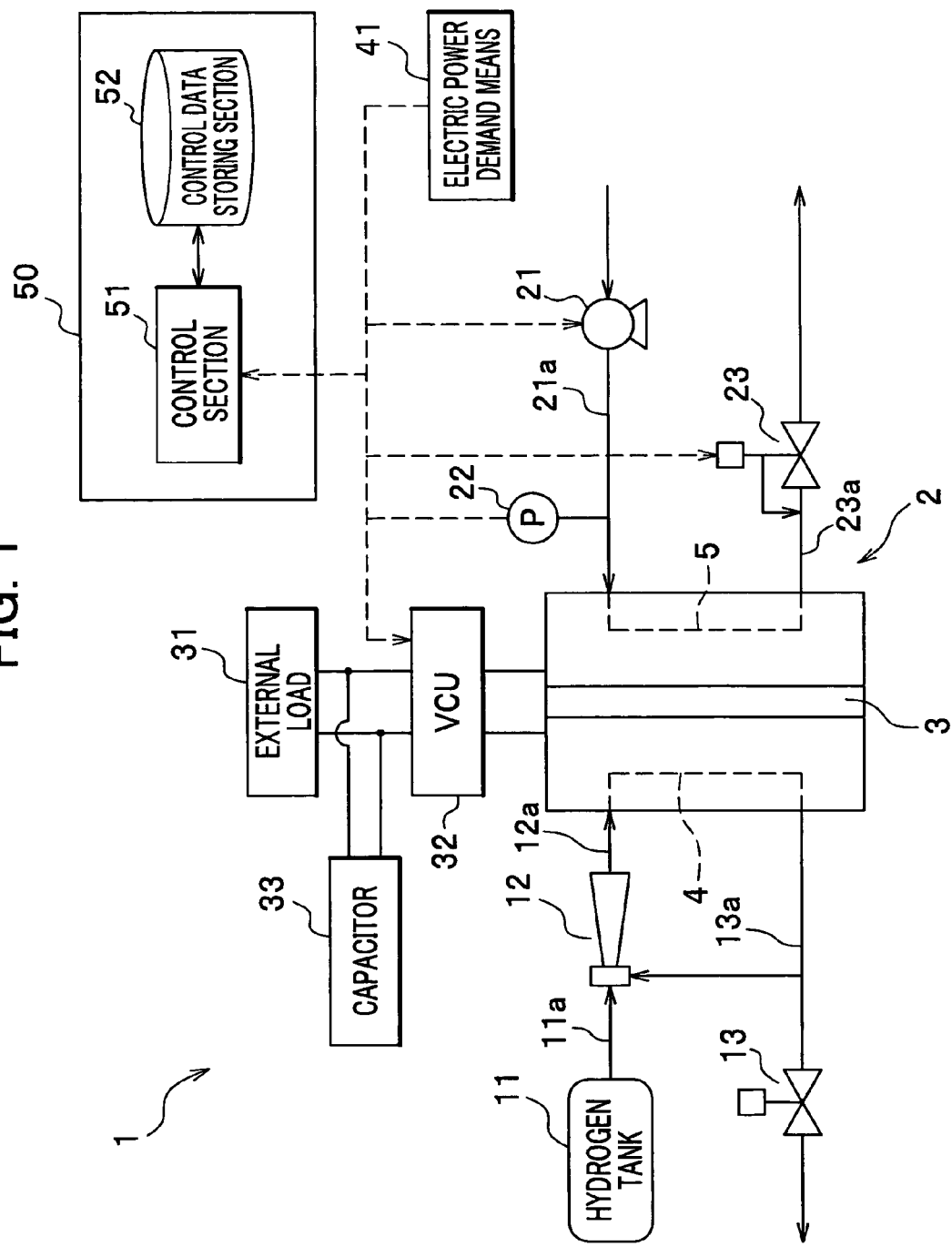
FIG. 1 is a block diagram of a fuel cell system according to one embodiment of the present invention.

As shown in FIG. 1, a fuel cell system 1 according to this embodiment is one to be mounted on a fuel cell vehicle, and is composed mainly of a fuel cell 2; an anode system which supplies and exhausts hydrogen gas (fuel gas or reactant gas) on an anode side of the fuel cell 2; a cathode system which supplies and exhausts humidified air (oxidant gas or reactant gas) on a cathode side of the fuel cell 2; a power consumption system connected to an output terminal of the fuel cell 2; an electric power demand means 41; and an ECU 50 (electronic control unit or control device) which controls the above-mentioned components.

<Fuel Cell>

The fuel cell 2 (fuel-cell stack) has a laminated structure made of a plurality of membrane electrode complexes (each complex is frequently referred to as "MEA" (membrane electrode assembly)) and separators sandwiched therebetween, each of which MEA is formed by sandwiching a monovalent cation exchange type electrolyte membrane 3 between an anode (fuel electrode) and a cathode (air electrode). On the separator are formed grooves and the like, which are for supplying hydrogen gas (fuel gas) and humidified air (oxidant gas) to the whole surface of the electrolyte membrane 3, through holes for providing the gases to each single cell. The grooves and the like serve as a fuel gas flow path 4 and an oxidant gas flow path 5 on respective sides of the MEA. The hydrogen gas flows through the fuel gas flow path 4 and is fed to each anode; while the humidified air flows through the oxidant gas flow path 5 and is fed to each cathode.

Supplying the hydrogen gas and the humidified air to the anodes and the cathodes, respectively, causes electrochemical reaction in the anodes and the cathodes, which generates a predetermined potential difference in each single cell. Since the single cells are connected in tandem, a large amount of power can be exerted from the fuel cell 2.

<Anode System>

The anode system is disposed on the anode side of the fuel cell 2, and supplies/exhausts hydrogen gas.

<Anode System—Hydrogen Gas Supply Side>

The hydrogen gas supply side of the anode system is provided mainly with a hydrogen tank 11 for storing hydrogen gas, and an ejector 12. The hydrogen tank 11 is connected to the ejector 12 located downstream thereof through a pipe 11a, and the ejector 12 is connected to the fuel gas flow path 4 of the fuel cell 2 through a pipe 12a. The pipe 11a is equipped with a shutoff valve and a reducing valve (both not shown) in this order towards the ejector 12. By opening the shutoff valve, the pressure of the hydrogen gas is reduced to a predetermined pressure and the resultant hydrogen gas is fed to the fuel gas flow path 4.

<Anode System—Hydrogen Gas Exhaust Side>

The hydrogen gas exhaust side of the anode system is provided mainly with a purge valve 13, which is connected to the downstream of the fuel gas flow path 4 through a pipe 13a. The pipe 13a is branched in midstream, and the branched line is connected to the ejector 12.

Normally, the purge valve 13 is closed to circulate unreacted hydrogen gas contained in the exhaust gas (anode-off gas or anode exhaust gas) from the fuel gas flow path 4, so that hydrogen gas is efficiently utilized. When the water content of the anode exhaust gas becomes high and the voltage of the fuel cell 2 or a single cell becomes low, the anode exhaust gas with high water content can be exhausted by opening the purge valve 13.

<Cathode System>

The cathode system is disposed on the cathode side of the fuel cell 2, and mainly supplies/exhausts humidified air.

<Cathode System—Air Supply Side>

The air supply side of the cathode system is provided mainly with a compressor 21 (pump or oxidant gas supply means) and a pressure sensor 22 (pressure measuring means).

[Compressor]

The compressor 21 is a device which breathes air, compresses the air to a predetermined degree, and feeds the compressed air to the fuel cell 2. The compressor 21 is connected to the oxidant gas flow path 5 of the fuel cell 2 through a pipe 21a. On the pipe 21a, a humidifier (not shown) is disposed, which humidifies air taken in by the compressor 21 to a predetermined degree when the fuel cell 2 is in normal power generation mode.

The compressor 21 is electrically connected to a control section 51 of the ECU 50 which will be described below, and the control section 51 can drive the compressor 21 at a desired rotation speed.

The pressure sensor 22, which is disposed on the pipe 21a, can measure an actual pressure of the oxidant gas in the oxidant gas flow path 5 of the fuel cell 2 (hereinbelow, this pressure is frequently referred to as "measured pressure P11"). The pressure sensor 22 is electrically connected to the control section 51 of the ECU 50 which will be described below, and the control section 51 can monitor the measured pressure P11.

<Cathode System—Air Exhaust Side>

The air exhaust side of the cathode system is provided mainly with a back-pressure regulating valve 23 (pressure control means).

[Back-Pressure Regulating Valve]

The back-pressure regulating valve 23 is connected to the downstream of the oxidant gas flow path 5 through a pipe 23a. By appropriately adjusting the opening degree of the back-pressure regulating valve 23, the back pressure, i.e. the pressure of the oxidant gas in the oxidant gas flow path 5, can be controlled.

The back-pressure regulating valve 23 is electrically connected to the control section 51 of the ECU 50 which will be described below, and the control section 51 sets the back-pressure regulating valve 23 to a desired opening degree, so as to control the pressure of the oxidant gas in the oxidant gas flow path 5.

The back-pressure regulating valve 23 has a function of independently measuring an actual opening degree (measured opening degree V11) of the back-pressure regulating valve, and the control section 51 electrically connected thereto can monitor the measured opening degree V11.

<Power Consumption System>

The power consumption system is provided mainly with an external load 31, a VCU 32 (extracted current limiting means) and a capacitor 33 (condenser).

The external load 31, which includes a driving motor for running a fuel cell vehicle, a heater and a motor for air-conditioning and the like, is connected to the output terminal of the fuel cell 2 through the VCU 32. The capacitor 33 is disposed between the external load 31 and the VCU 32, in parallel with the external load 31.

[VCU]

The VCU 32 is connected to the output terminal of the fuel cell 2 and limits the current from the fuel cell 2. The VCU 32 is electrically connected to the control section 51 of the ECU 50 which will be described below. The control section 51 sets the desired upper limit of the current extracted from the fuel cell 2 (extracted current upper limit I1) for the VCU 32. With this setting, the capacitor 33 can be charged in accordance with the generation condition of the fuel cell 2.

Examples of the VCU 32 include a DC-DC chopper. The DC-DC chopper is provided with a transistor having a switching function. When the control section 51 alters a duty ratio of pulse signal and sends the altered duty ratio to the transistor, a desired amount of current can be obtained from the fuel cell 2.

<Electric Power Demand Means>

The electric power demand means 41 demands electric power generation from the fuel cell 2, and examples include an accelerator pedal of a fuel cell vehicle. The electric power demand means 41 is electrically connected to the control section 51 of the ECU 50 which will be described below, and the control section 51 can monitor the amount of demanded electric power.

<ECU>

Main function of the ECU 50 is to control the compressor 21, the back-pressure regulating valve 23 and the VCU 32. The ECU 50 includes a CPU, a ROM, a RAM, various interfaces, electronic circuits, various recording media and the like, and is formed mainly of the control section 51 (operating condition control means) and a control data storing section 52.

[Control Section]

The control section 51 is electrically connected to the compressor 21, and drives the compressor 21 at a desired rotation speed (desired operating condition). The control section 51 is electrically connected to the electric power demand means 41, and can monitor the amount of power generation demanded in the fuel cell 2.

The control section 51 has a function of calculating the target flow rate Q1 of the humidified air in the oxidant gas flow path 5 based on a target power generation which corresponds to an amount of power generation demanded by the electric power demand means 41, with reference to control data A. The control section 51 also has a function of calculating the target pressure P1 based on the target power generation with reference to the control data A (see FIG. 3, S101).

Figure 3:
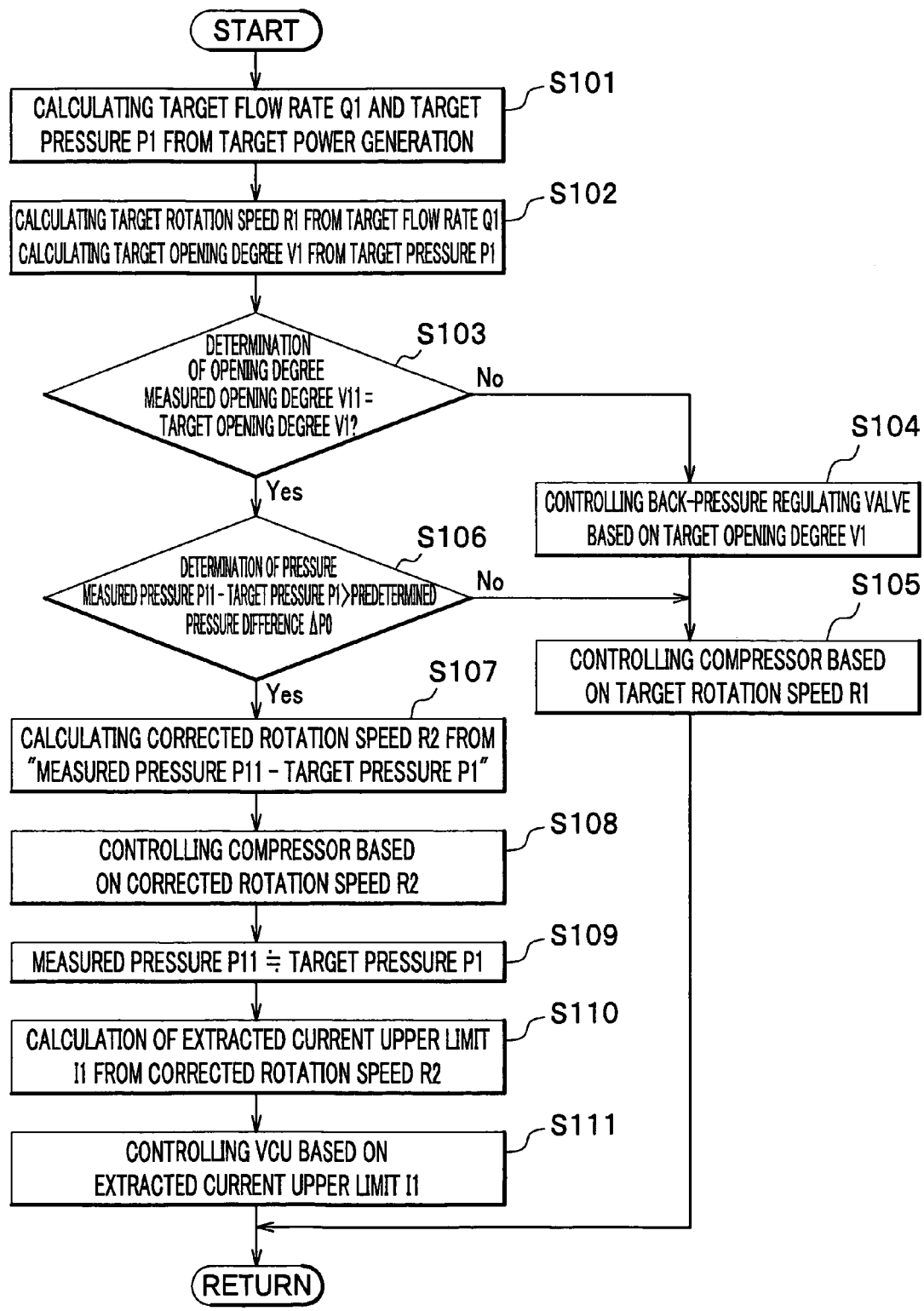
FIG. 3 is a flow chart explaining operation of the fuel cell system according to one embodiment of the present invention.

The control section 51 has a function of calculating the target rotation speed R1 of the compressor 21, based on the target flow rate Q1 with reference to control data B (see FIG. 3, S102). The control section 51 also has a function of calculating the target opening degree V1 of the back-pressure regulating valve 23, based on the target pressure P1 with reference to control data C which will be described below (see FIG. 3, S102).

The control section 51 has a function of determining whether or not the measured opening degree V11 measured by the back-pressure regulating valve 23 is equal to the target opening degree V1 (see FIG. 3, S103). The control section 51 also has a function of determining whether or not the pressure difference between the measured pressure P11 and the target pressure P1 is larger than a predetermined pressure difference ΔP0 (see FIG. 3, S106).

Further, the control section 51 has a function of calculating a corrected rotation speed R2 of the compressor 21, based on "the difference between the measured pressure P11 and the target pressure P1" with reference to control data D which will be described below (see FIG. 2, arrow A1 and FIG. 3, S107).

Furthermore, the control section 51 has a function of calculating the extracted current upper limit I1, based on the corrected rotation speed R2 with reference to control data E which will be described below (see FIG. 3, S110). Finally, the control section 51 has a function of controlling the VCU 32 (extracted current limiting means) based on the extracted current upper limit I1 (see FIG. 3, S111).

[Control Data Storing Section]

The control data storing section 52 stores the control data A-E obtained in preparatory studies. The control data storing section 52 is electrically connected to the control section 51, which can access to the control data storing section 52 to refer the control data A-E when necessary.

The control data A is data in which a target power generation (based on the amount of power generation demanded by the electric power demand means 41), a target flow rate Q1 of the humidified air in the oxidant gas flow path 5, and a target pressure P1 of the humidified air are related to one another. The control data B is data in which a target flow rate Q1 of the humidified air and a target rotation speed R1 of the compressor 21 are related to each other. The control data C is data in which a target pressure P1 and a target opening degree V1 of the back-pressure regulating valve 23 are related to each other. The control data D is data in which a pressure difference (P11−P1) between the measured pressure P11 and the target pressure P1, and a rotation speed of the compressor 21 are related to each other. The control data E is data in which a rotation speed of the compressor 21 and an upper limit of the extracted current from the fuel cell 2 are related to each other.

Figure 2:
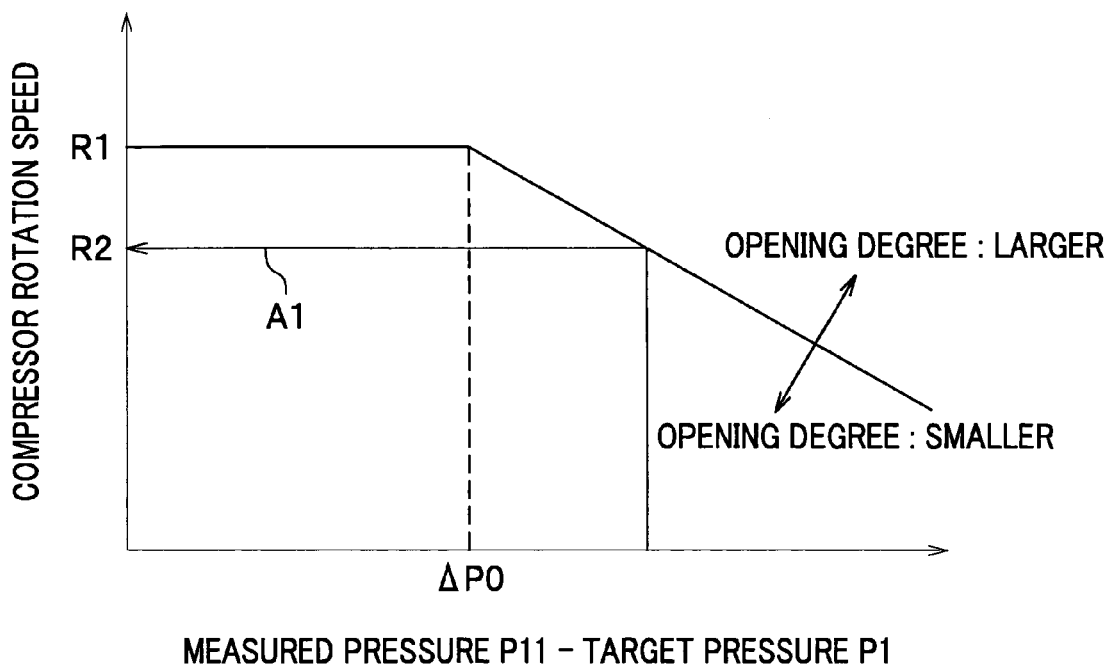
FIG. 2 is a graph showing a relationship between a compressor rotation speed and a pressure difference between a measured pressure P11 and a target pressure P1.

FIG. 2 shows a graph obtained by plotting the control data D. When "the pressure difference (P11−P1) between the measured pressure P11 and the target pressure P1" is equal to or smaller than the predetermined pressure difference ΔP0, the compressor rotation speed becomes constant; in the case where "the pressure difference (P11−P1) between the measured pressure P11 and the target pressure P1" is larger than the predetermined pressure difference ΔP0, the compressor rotation speed becomes smaller as "the pressure difference" becomes larger.

It should be noted that the graph shown in FIG. 2 varies depending on the opening degree of the back-pressure regulating valve 23, and FIG. 2 shows a case where the measured opening degree V11 of the back-pressure regulating valve 23 is equal to the target opening degree V1 (V11=V1). When the measured opening degree V11 of the back-pressure regulating valve 23 is larger than the target opening degree V1 (V11>V1), the graph shown in FIG. 2 shifts diagonally upward. When the measured opening degree V11 is smaller than the target opening degree V1 (V11<V1), the graph shits diagonally downward.

<<Operation of Fuel Cell System>>

Referring to FIG. 3 with FIGS. 1 and 2, operation of the fuel cell system 1 is explained along with the control flow set in the ECU 50.

It should be noted that the ECU 50 continuously repeats the process unit shown in FIG. 3, which begins with "start" and ends with "return".

In the step S101, the control section 51 sets the target power generation based on the amount of the power generation demanded by the electric power demand means 41. The control section 51 also calculates a target flow rate Q1 and a target pressure P1 based on the target power generation with reference to the control data A.

In the step S102, the control section 51 calculates a target rotation speed R1 based on the target flow rate Q1 with reference to the control data B. The control section 51 also calculates a target opening degree V1 of the back-pressure regulating valve 23 based on the target pressure P1 with reference to the control data C.

In the step S103, the control section 51 determines whether or not the measured opening degree V11 of the back-pressure regulating valve 23 is equal to the target opening degree V1. When the measured opening degree V11 is determined to be equal to the target opening degree V1 (V11=V1), the process moves on to the step S106. When the measured opening degree V11 is determined not to be the target opening degree V1 (V11≠V1), the process moves on to the step S104.

In the step S104, the control section 51 controls the back-pressure regulating valve 23 based on the target opening degree V1.

In the step S105, the control section 51 controls the compressor 21 based on the target rotation speed R1.

Subsequently, the process moves on to "return" and then goes back to "start."

In the step S106, the control section 51 determines whether or not the pressure difference (P11−P1) between the measured pressure P11 and the target pressure P1 is larger than the predetermined pressure difference ΔP0.

When the pressure difference between the measured pressure P11 and the target pressure P1 is determined to be larger than the predetermined pressure difference ΔP0 (P11−P1>ΔP0), the process moves on to the step S107. It should be noted that, when the process moves on to the step S107, it implies that the back-pressure regulating valve 23 is clogged with foreign substance, such as ice, even though the opening degree is equal to the target opening degree V1.

When the pressure difference between the measured pressure P11 and the target pressure P1 is equal to or less than the predetermined pressure difference ΔP0 (P11−P1≦ΔP0), the process moves on to the step S105. When the measured opening degree V11 or the measured pressure P11 is in error tolerance level, the process moves on to the step S105.

In the step S107, the control section 51 calculate a corrected rotation speed R2, which is smaller than the target rotation speed R1, based on the difference between the measured pressure P11 and the target pressure P1 with reference to the control data D (see FIG. 2, arrow A1).

Alternatively, the corrected rotation speed R2 can be obtained by subtracting a predetermined rotation speed from the target rotation speed R1. This predetermined rotation speed can be obtained by PI-control of the pressure difference (P11−P1) between the measured pressure P11 and the target pressure P1.

In the step S108, the control section 51 controls the compressor 21 based on the corrected rotation speed R2. As a result, the rotation speed of the compressor is lowered, and the measured pressure P11 becomes approximate to the target pressure P1 (S109). For this reason, extreme elevation of the pressure of the oxidant gas in the oxidant gas flow path can be prevented, which in turn prevents failure of devices, such as electrolyte membrane 3.

In the step S110, the control section 51 calculates a extracted current upper limit I1 based on the corrected rotation speed R2 with reference to the control data E.

In the step S111, the control section 51 sets the extracted current upper limit I1 in VCU 32. With this setting, excessive extraction of current from the fuel cell 2 is prevented. To put it another way, the lowering of voltage of a single cell composing the fuel cell 2, as well as the lowering of output voltage of the fuel cell 2, can be prevented, which may be caused by excessive extraction of current.

In the fuel cell system 1 where a decrease in the voltage of a single cell is judged as an increased water content in the hydrogen gas, leading to discharge (purge) of the hydrogen gas, unnecessary exhaust of hydrogen gas can be prevented by avoiding lowering of the voltage of the single cell.

By setting the extracted current upper limit, the capacitor 33 connected to the fuel cell 2 can be charged in accordance with the power generation condition of the fuel cell 2.

Subsequently, the process moves on to "return" and goes back to "start."

Briefly, when ice or the like is clogging the system, even though the measured opening degree V11 of the back-pressure regulating valve 23 is equal to the target opening degree V1 (S103=Yes), the pressure difference between the measured pressure P11 and the target pressure P1 becomes larger than the predetermined pressure difference ΔP0 (S106=Yes), and the process moves on to the steps S107, S108, S109, S110 and S111. On the other hand, when the clogged ice in the back-pressure regulating valve 23 melts, determination at the step S106 is "No".

As described above, the fuel cell system 1 of this embodiment, in which the pressure of the humidified air (oxidant gas) in the oxidant gas flow path 5 is regulated to become equal or approximate to the target pressure P1 by the back-pressure regulating valve 23 (pressure control means) (S106), brings about the following advantage. When the pressure difference between the pressure P11 measured by the pressure sensor 22 (pressure measuring means) and the target pressure P1 is larger than the predetermined pressure difference ΔP0 (S106=Yes), the control section 51 corrects the operating conditions of the compressor 21 (oxidant gas supply means) from the target rotation speed R1 to the corrected rotation speed R2. In this way, the measured pressure P11 becomes the target pressure P1 (S107 and S108), so that the fuel cell system 1 is able to prevent failure of devices, such as electrolyte membrane 3.

In the case where the operating conditions of the compressor 21 are corrected, the control section 51 sets the extracted current upper limit I1 in VCU (extracted current limiting means) in accordance with the corrected rotation speed R2 (operating conditions). As a result, unnecessary purge (exhaust) of hydrogen gas is prevented, and at the same time, the capacitor 33 can be charged in accordance with the power generation condition of the fuel cell 2.

Although the embodiment of the present invention is described, the invention is not limited thereto and can be embodied with being changed as needed. For example, following modification can be applied.

In the above-mentioned embodiment, the pressure sensor 22 (pressure measuring means) is disposed upstream of the fuel cell 2. However, there is no limitation with respect to the position of the pressure sensor 22 and the pressure sensor 22 may be alternatively disposed downstream of the fuel cell 2, as long as the pressure of the oxidant gas in the oxidant gas flow path 5 can be measured.

What is claimed is:

1. A fuel cell system comprising:
a fuel cell having a fuel gas flow path and an oxidant gas flow path, the fuel cell generating electricity with a fuel gas and an oxidant gas supplied to the fuel gas flow path and the oxidant gas flow path, respectively;
an oxidant gas supply means configured to supply the oxidant gas to the oxidant gas flow path;
a pressure control means which is disposed downstream of the fuel cell and configured to control a pressure of the oxidant gas in the oxidant gas flow path;
a pressure measuring means configured to measure the pressure of the oxidant gas in the oxidant gas flow path; and
an operating condition control means configured to control the oxidant gas supply means and the pressure control means,
wherein the pressure of the oxidant gas in the oxidant gas flow path is regulated to become equal or approximate to a target pressure by the pressure control means, and wherein when a pressure difference between the pressure measured by the pressure measuring means and the target pressure is larger than a predetermined pressure difference, the operating condition control means corrects operating conditions of the oxidant gas supply means based on an opening degree of the pressure control means, so that the measured pressure becomes the target pressure.

2. The fuel cell system according to claim 1, further comprising extracted current limiting means configured to limit an extracted current from the fuel cell, wherein
when the operating condition control means generates corrected operating conditions of the oxidant gas supply means, the operating condition control means determines an upper limit for the extracted current limiting means in accordance with the corrected operating conditions.

3. The fuel cell system according to claim 1, further comprising electric power demand means configured to demand electric power generation from the fuel cell, wherein the operating condition control means sets the target pressure based on an amount of a power generation demanded by the electric power demand means.

4. The fuel cell system according to claim 2, further comprising electric power demand means configured to demand electric power generation from the fuel cell, wherein the operating condition control means sets the target pressure based on an amount of a power generation demanded by the electric power demand means.

5. The fuel cell system according to claim 1, which is provided on a vehicle.

6. The fuel cell system according to claim 2, which is provided on a vehicle.

7. A fuel cell system comprising:
a fuel cell having a fuel gas flow path and an oxidant gas flow path, the fuel cell generating electricity with a fuel gas and an oxidant gas supplied to the fuel gas flow path and the oxidant gas flow path, respectively;
an oxidant gas supply component configured to supply the oxidant gas to the oxidant gas flow path;
a pressure control component which is disposed downstream of the fuel cell and configured to control a pressure of the oxidant gas in the oxidant gas flow path;
a pressure measuring component configured to measure the pressure of the oxidant gas in the oxidant gas flow path; and
an operating condition control unit configured to control the oxidant gas supply component and the pressure control component,
wherein the pressure of the oxidant gas in the oxidant gas flow path is regulated to become equal or approximate to a target pressure by the pressure control unit, and
wherein when a pressure difference between the pressure measured by the pressure measuring component and the target pressure is larger than a predetermined pressure difference, the operating condition control unit corrects operating conditions of the oxidant gas supply component based on an opening degree of the pressure control component, so that the measured pressure becomes the target pressure.

8. The fuel cell system according to claim 7, further comprising extracted current limiting component configured to limit an extracted current from the fuel cell, wherein
when the operating condition control unit generates corrected operating conditions of the oxidant gas supply component, the operating condition control unit determines an upper limit for the extracted current limiting component in accordance with the corrected operating conditions.

9. The fuel cell system according to claim 7, further comprising electric power demand component configured to demand electric power generation from the fuel cell, wherein the operating condition control unit sets the target pressure based on an amount of a power generation demanded by the electric power demand component.

10. The fuel cell system according to claim 8, further comprising electric power demand component configured to demand electric power generation from the fuel cell, wherein the operating condition control unit sets the target pressure based on an amount of a power generation demanded by the electric power demand component.

11. The fuel cell system according to claim 7, which is provided on a vehicle.

12. The fuel cell system according to claim 8, which is provided on a vehicle.

13. A method for operating a fuel cell system, the system comprising:
a fuel cell having a fuel gas flow path and an oxidant gas flow path, the fuel cell generating electricity with a fuel gas and an oxidant gas supplied to the fuel gas flow path and the oxidant gas flow path, respectively;
an oxidant gas supply component configured to supply the oxidant gas to the oxidant gas flow path;
a pressure control component which is disposed downstream of the fuel cell and configured to control a pressure of the oxidant gas in the oxidant gas flow path;
a pressure measuring component configured to measure the pressure of the oxidant gas in the oxidant gas flow path; and
an operating condition control unit configured to control the oxidant gas supply component and the pressure control component,
the method including:
regulating the pressure of the oxidant gas in the oxidant gas flow path to become equal or approximate to a target pressure by the pressure control unit, and
when a pressure difference between the pressure measured by the pressure measuring component and the target pressure is larger than a predetermined pressure difference, correcting operating conditions of the oxidant gas supply component by the operating condition control unit based on an opening degree of the pressure control component, so that the measured pressure becomes the target pressure.

* * * * *